Patented Aug. 8, 1933

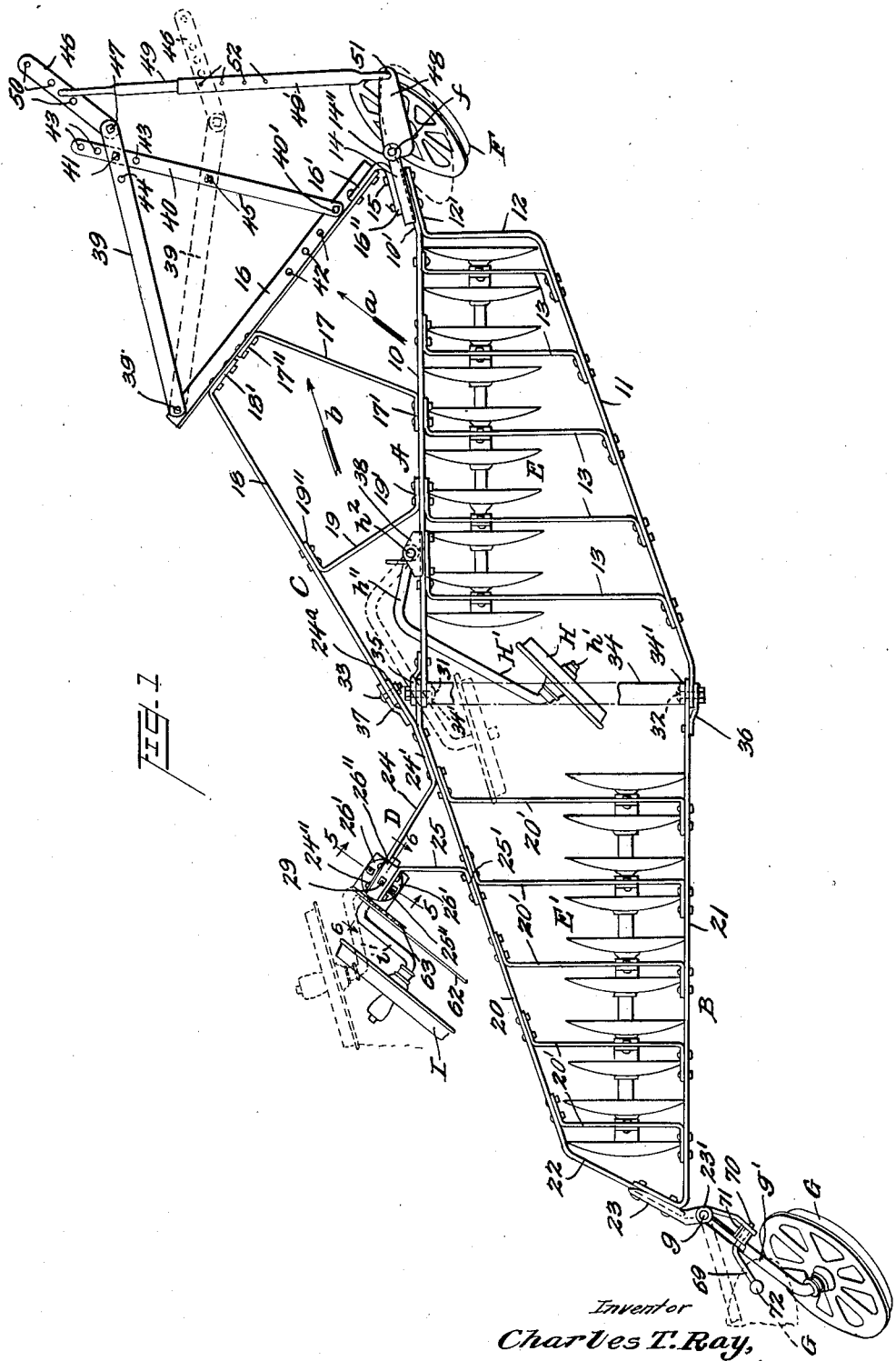

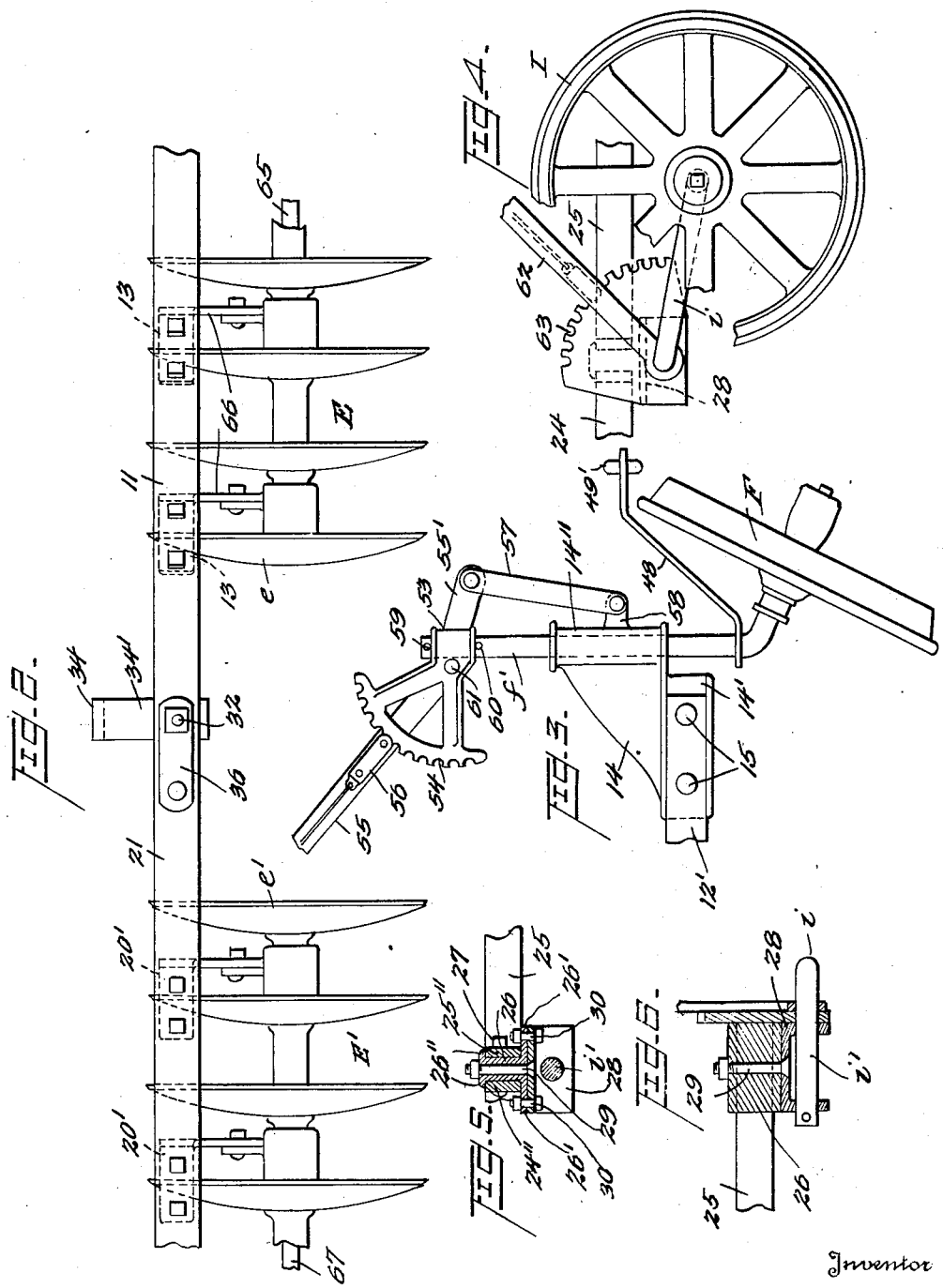

1,921,480

UNITED STATES PATENT OFFICE 1,921,480

TILLAGE IMPLEMENT

Charles T. Ray, Louisville, Ky., assignor to B. F. Avery & Sons, Louisville, Ky., a Corporation of Kentucky Application August 31, 1928. Serial No. 303,247

21 Claims. (Cl. 97—77)

This invention generically comprehends a soil working implement, as a disk plow, for example, whose frame includes a plurality of flexibly connected units which support a plurality of soil working members and which implement also comprises ground engaging supporting members so arranged with relation to the flexibly connected frame units as co-operatively therewith to cause said units, and hence the soil working members carried thereby, to move relatively to each other and thereby be automatically adjusted to produce furrows of uniform depth regardless of any unevenness in the land being worked.

In a more particular sense, the invention comprehends a one-way disk plow comprising flexibly connected wheel supported open frame units respectively provided with gangs or sets of plowing disks all of which work simultaneously and which gangs or sets of soil turning disks are, by reason of the correlation of the flexible connection of their respective frame units and the supporting wheels, enabled to produce furrows of substantially uniform depth regardless of any unevenness in the land being plowed.

The invention further comprehends a soil working implement as a disk plow, for example, comprising a plurality of soil working members, a frame, supporting wheels and a draft mechanism, so correlated that the angle of these parts with relation to the line of travel of the implement when in transport position, as when going from field to field, or between field and barn, for example, will be different from their angle with relation to the line of travel of the implement in the actual soil working operation, and such that the implement will occupy a space of lesser width when its parts are in transport relation than when in plowing relation.

The invention also comprehends a frame construction adaptable to an implement of the nature hereinbefore expressed and particularly characterized by simplicity, strength and light weight.

Moreover, the invention comprehends novel combinations and correlations of elements by which its fundamental purposes, hereinbefore suggested, may be carried out in a most practicable and beneficial way.

The accompanying figures of drawings illustrate a one-way four-wheel tractor-drawn gang disk plow in which features which enter into the present invention may be most usefully embodied, and said figures of drawings also illustrate what is now regarded as being the best detail embodiment of the invention. It should be understood, however, that although I shall describe the illustrated embodiment minutely, it is not to be assumed that the invention is in all respects restricted to the details of such minutely described embodiment, since I realize that changes in details may be made and that the invention may be otherwise and variously embodied without departing from the substance defined by appended claims.

Fig. 1 is a plan view of the implement with the mechanism for adjusting the furrow wheels to regulate the height of the frame mainly omitted in order that other parts which would be concealed thereby may be shown. This figure shows in full outline the position of the parts with relation to the line of travel of the implement—indicated by arrow $a$ when working the soil, and in dotted outline and by the arrow $b$ the transport position of the parts with relation to the line of travel of the implement;

Fig. 2 is a rear end view of that part of the implement at and adjacent the junction of the two frame units which respectively carry a gang of disks;

Fig. 3 is a detail of one end of the forward disk-carrying frame unit, showing the manner of connecting thereto the furrow wheel which supports this end of the implement, and also showing means for adjusting this end of the frame selectively to different heights from the ground, for leveling or other purposes, and, further, showing an element of the connection between said wheel and the draft mechanism;

Fig. 4 is a detail view of the land wheel and mechanism for adjusting the same, vertically;

Fig. 5 is a cross section on the line 5—5 of Fig. 1; and

Fig. 6 is a vertical section on the line 6—6 of Fig. 1.

The frame of the implement comprises a first plurality of flexibly mounted frame units A and B, hereinafter called disk-carrying units, arranged in an end-to-end relation and a second plurality of flexibly mounted units C and D similarly arranged in an end-to-end relation and respectively rigidly secured to the units A and B. These several units are so arranged with relation to each other and with the line of the draft applied to the unit C, (hereinafter called draft unit) that the disk-carrying units A, B will extend in a direction which is diagonal to the line of travel of the implement, particularly during the plowing operation. E and E' designate the disk gangs. These are carried by the units A and B, respectively, and extend longitudinally thereof. The implement is supported by furrow wheels F, G and H and a land wheel I. The furrow wheel F is at the forward end of the unit A and supports said end and also the forward end of the draft unit C. The furrow wheel G supports the outer or rear end of the frame unit B. The furrow wheel H is arranged in such relation to the places at which the units A and B and the units C and D are flexibly connected with each other as to provide a support adjacent that part of the implement at which the units A and C are flexibly connected to the units B and D, respectively. The land wheel I is connected to the unit D and supports said units and in co-operation with the furrow wheel G supports the rear disk-carrying unit B.

These wheels, in the practical embodiment of the invention, are so connected with the frame that they are individually settable to different selected heights to thereby level the frame and to regulate the depth of the furrows produced by the ground working members; and each has movement about a vertical axis. Moreover, the front furrow wheel F is connected with the steering mechanism, preferably by the means hereinafter set forth. The furrow wheels G and H have free movement about their respective vertical axes, and in the present exemplification are in the nature of trailing wheels which adjust themselves about their said vertical axes to the line of travel of the implement.

Referring now more particularly to details of the illustrated embodiment of the invention, it will be noticed that the several units are constructed as follows:—

The forward disk-carrying frame unit A comprises spaced front and rear members, 10 and 11, connected to each other at their outer or forward ends by a cross member 12 and at places intermediate their ends by cross members 13 which stiffen the members 10 and 11 and serve as supports for the disk gang E. The member 12 is here shown as integral with the member 11 and as having a bent forward end 12' which lies against the forward end 10' of the member 19. A bracket 14 has its lower end 14' arranged parallel with the end members 10' and 12' and has its forward end vertically prolonged and hollow to provide a bearing 14'' for the shaft f of the forward furrow wheel F. The base 14' of the bracket 14 and the ends 10', 12' of the members 10 and 12 are secured to each other by through bolts 15.

The draft frame unit C includes a diagonally arranged forward member 16, L-shaped in cross section, one of whose ends is rigidly secured to the forward end of the disk-carrying unit A through the medium of a bracket having an arm 16' bolted to the member 16 and an arm 16'' secured to the front end of the member A by the bolts 15 hereinbefore referred to. This draft unit C also comprises a bracing member 17, having a laterally bent end 17' bolted to the member 10 of the unit A and a laterally bent end 17'' bolted to the member 16; and additionally comprises a member 18 whose forward end 18' is bolted to the member 16 and whose intermediate portion is rigidly connected to the member 10 of the disk-carrying unit A by a brace 19 having laterally bent ends 19' and 19'', respectively, bolted to the said members 10 and 18.

The rear disk-carrying frame unit B is formed of a front member 20, a rear member 21, a cross member 22 which connects the members 20 and 21 to each other at one end of the frame and a bracket 23 which is secured to the member 22 and is formed to provide a vertical bearing 23' for the shaft g which is integral with the forward end of the axle g' of the rear furrow wheel G. This frame also includes cross members 20' whose ends are bent laterally and are rigidly bolted to and stiffen the members 20 and 21 and serve as supports for the disk gang E'.

The unit D of the frame includes two members 24 and 25, respectively, whose inner ends are bent laterally and are rigidly fastened to the front member 20 of the disk-carrying frame unit B, as shown at 24' and 25', respectively. These members 24 and 25 converge toward each other from the member 20 and terminate in substantially parallel outer end portions 24'' and 25'' which lie against the opposite sides of a re-enforcing member, here shown as a block 26 whose base is formed to provide lateral extensions 26' and whose upper end is formed at opposite sides to provide lips 26''.

The lower edges of the forward ends 24'' and 25'' of the members 24 and 25 bear against corresponding portions of the base 26' and their upper ends are engaged by the lips 26''. These forward ends of the members 24'' and 25'' are secured to the sides of the block 26 by cross bolts 27. The block 26 provides a connection between the outer ends 24'' and 25'' of the members 24 and 25 and also forms a support for a yoke 28, or other suitable member, adapted to provide a bearing for the arm i' of the land wheel crank axle i. Said yoke is pivotally connected to the base of the block 26 by the pivot 29 and is held releasably against movement about said pivot by appropriate fastening elements, as bolts 30, for example, which extend through the base extensions 26'.

It will be noticed that the correlation of the members 10 and 11 of the forward disk-carrying frame unit A is such that said unit is of open construction and has a greater diameter at its inner end than at its outer end and that this is true also with respect to the members 20 and 21 of the disk-carrying frame unit B. It will also be noticed that the members 10 and 20 of the units A, B, have overlapping ends which are flexibly connected to each other by a horizontal pivot 31, and that the members 11 and 21 of said units similarly overlap at their ends and are connected to each other by a horizontal pivot 32 which is in the transverse vertical plane of the pivot 31, and that the member 18 of the draft unit C has one of its ends in an overlapping relationship with a member 24ᵃ extending from the member 24' of the frame unit D and is flexibly connected thereby by a horizontal pivot 33 which is substantially in line with the pivots 31 and 32. Accordingly, it will be seen that the disk-carrying frame units A and B are movable relatively to each other about an axis extending through the pivots 31, 32 and that the frame units C and D similarly are movable relatively to each other, and with the units A and B, respectively, about an axis extending through the pivot 33.

To stiffen the frame at the places where the units A, B are jointed to each other, I prefer to employ a bracing member 34 which extends transversely of the frame and has depending legs 34' through which the pivot bolts 31, 32, respectively, extend. The pivot bolt 31 preferably extends also through one end of a bracket 35 whose opposite end is fastened to the front member 10 of the unit A and the pivot bolt 32 similarly preferably extends through one end of a bracket 36 whose opposite ends are fastened to the rear member 21 of the unit D. These brackets give additional stability to the units A, B at the places where their members are jointed. A similar bracket 37 secured to the end portion 24' of the member 24 of the unit D is provided for the pivot bolt 33, for a like purpose.

Reference has been made to the fact that the units A and B are of greater diameter at their inner ends than at their outer ends. In other words, these units have their greater diameter at the places where they are jointed to each other. This provides an excellent construction with respect to rigidity, strength and light weight. It also provides space within which the furrow wheel H, which supports the frame at a place intermediate the length of the latter and adjacent its joint, may be arranged and may have movement about a vertical axis between the full line position and the dotted line position shown in Fig. 1. In this connection, it will be noticed that the front member 10 of the front unit A and the rear member 21 of the rear unit B are in an offset relation and extend along lines which, if continued toward the left and right, respectively, would be parallel. It will also be noticed that the gangs E and E', are arranged between the front and rear members of the frame units A, B, respectively, and that their respective shafts are parallel with and their disks are substantially at right angles to, the members 10 and 21, of said units.

Accordingly, and since the frame members 10 and 21 are diagonal to the line of travel of the implement in the plowing operation, indicated by the arrow a, Fig. 1, it will be apparent that the disks of the two gangs E and E' will be arranged in proper relation to each other and to said line of travel for the simultaneous plowing of a corresponding series of properly related furrows, while providing space between the inner disks e and e' of the gangs E and E', respectively, for the furrow wheel H during the plowing operation and for its movement to its dotted line position for transport purposes.

This furrow wheel H is rotatably mounted on a spindle h extending from and at an angle to one end of an arm h' of an axle H' whose opposite end is bent angularly as shown at h'' and terminates in a vertical shaft h². The shaft portion h² of this (crank) axle H' has its bearing in a suitably formed bracket 38 which is rigidly secured to the frame member 10.

The particular draft mechanism here shown, comprises two arms 39 and 40, respectively, whose rear ends are connected to the member 16 of the forward draft unit C by pivots 39' and 40'. These arms converge from their said pivotal connections to the member 16 and are connected to each other at their forward end by a pivot 41. It is preferred in practice to provide the member 16 with a plurality of holes 42 through any one of which the pivot 40' may extend and similarly to provide the arm 40 with a plurality of holes 43 through any one of which the pivot 41 may extend. The arm 39 also may be provided with a plurality of holes, one of which is shown at 44 to receive the pivot 41. The provision of these pluralities of holes obviously is to permit adjustment. The arm 40 has a separate hole, at the place indicated at 45, into which the pin 41 may be set in adjusting the draft mechanism for transport purposes, at which time, the line of travel of the implement will be that indicated by the arrow b, as hereinbefore set forth.

A hitch link 46, to be connected to a tractor or other suitable means, not shown, employed to draw the plow, has its rear end pivoted at 47 to the forward end of the arm 39 and has connection with an arm 48 which projects from the axle f of the front furrow wheel F. The connection between the hitch link 46 and the arm 48 is provided by an extensible arm composed of a member 49, one of whose ends is pivotally connected to the hitch link at any one of the places designated by the reference character 50, and a member 49', one of whose ends is pivoted to the outer end of the arm 48 at the place designated 51. The opposite ends of these members are in an overlapping relationship and are securable to each other by an appropriate fastening means at any one of the places designated 52. These members 49 and 49', when the fastening means which secured them to each other has been released, are movable longitudinally relatively to each other to thereby lengthen or shorten the space between the hitch link and the arm 48.

Reference has hereinbefore been made to the fact that in the practicable embodiment of the invention, the furrow wheels F, G and H are individually settable to different selected heights with relation to the respective frame units. The land wheel I similarly is provided with an appropriate means for adjusting it vertically with relation to the frame. The purpose of these adjustments is to variably regulate the depth of the furrows produced in the plowing operation.

It may be here mentioned that when the implement is being operated on an uneven surface, either of the furrow wheels F, G or H is capable of movement vertically relatively to the others and in its said movement will carry its portion of the frame with it. In this operation, the land wheel acts merely as a gauge wheel and neither contributes to nor interferes with, the relative movement of the frame units about the axes of the pivots 31, 32 and 33.

Any appropriate means by which the height of the frame units relatively to the land may be adjusted, may be resorted to without departing from the spirit of this invention. In Fig. 3, I have shown a desirable means for this purpose applied to the front end of the frame and front furrow wheel F and it should be understood that this means is applicable, in principle, to the rear furrow wheel G and to the intermediate furrow wheel H, also. In Fig. 4, I have shown a desirable means for a like purpose applied to the land wheel I and rear draft frame unit D.

The means shown in Fig. 3 comprises a sleeve 53, a segment 54, a hand lever 55, a latch or dog 56, a link 57 and a projection 58 from an appropriate part of the frame, as the member 14'' of the bracket 14, for example. The sleeve 53 in this embodiment is formed integral with and projects forwardly from the lower end of the segment 54. It encircles the upper end of the vertical shaft f of the furrow wheel F and provides a bearing in which the said upper end of the shaft f is rotatable for steering purposes and also while being moved from its full line position, which it occupies in the plowing operation, to the dotted line position which it occupies when the parts are in transport position. It is held against movement longitudinally of the shaft f by projections 59 and 60 which extend laterally from said shaft and engage its upper and lower surfaces.

The hand lever 55 is pivoted at 61 to the segment 54 and projects forwardly from the said pivot to provide the member 55' for the addition of the link 57. The upper end of the link 57 is pivoted to the part 55 of the hand lever and its lower end is pivoted to the projection 58. Accordingly, it will be seen that when the hand lever 55 is turned about its pivot 61, the contiguous ends of the frame units A and C will be correspondingly raised or lowered, since the bracket 14 which is rigidly connected to said ends of the frame units A and C will be raised or lowered upon the shaft f.

In this movement of said frame units, their opposite ends turn about the pivots 31, 32 and 33. When the required adjustment has been made, the parts are secured therein through the co-operative action of the dog 56 and the teeth of the segment 54, as is well understood in the implement art. The applicability of an adjusting means of this construction to the vertical shaft g of the rear furrow wheel G and to the vertical shaft $h^2$ of the intermediate furrow wheel H will be apparent.

The relative adjustment of the land wheel axle and frame unit D to vary the height of the corresponding part of the frame with relation to the ground is provided for in this particular exemplification of the invention by a hand lever 62 which is secured to the arm $i'$ of the crank axle $i$ of the land wheel I at one of its ends so as to rotate said arm $i'$ in its bearing in the yoke 28. A segment 63 (secured to the end of the block 26 which forms the connecting means between the end members 24'' and 25'' of the members 24 and 25 of the frame unit D) has its teeth arranged in such relation as to be capable of co-operating with said latch or dog 64 in holding the crank axle in the position to which it has been rocked in its bearings in the yoke 28 by movement of the lever 62.

The disks of the gang E are mounted rotatably on a shaft 65 and said disks and shaft are supported from the transverse frame members 13 by hangers 66. Similarly, the disks of the gang E' are mounted rotatably on a shaft 67 and said disks and shaft are supported from the transverse frame members 20'.

From the foregoing, it will be apparent that I have provided a strong and durable disk plow characterized by light weight and easy draft; and also characterized by a flexible connection of its frame units and a correlation of supporting wheels with said frame units such that the units adjust themselves relatively to each other automatically in accordance with any unevenness of the land to thereby produce furrows of uniform depth regardless of such unevenness; and additionally characterized in that its carrying wheels and its draft mechanism include provision for adjustments by which the width of the space occupied by the implement when its parts are in transport position is less than the width of the space occupied by the implement when its parts are in soil tilling position.

With respect to the adjustments which bring about the lessening of the width of the space occupied by the implement for its transportation purposes, it will be noticed: (1) That the furrow wheel F is adjusted from the full line position to the dotted line position by adjusting the member 39 of the draft means to the dotted line position shown in Fig. 1 and attaching it to the member 40 at the place marked 45; and by adjusting the members 49 and 49' relatively to each other, to shorten the length of the link formed by these members in accordance with the adjustment of the arm 39, and fastening them together; and (2) That the land wheel I is adjusted from the full line position to its dotted line position by releasing the fastening bolts 30, which secure the yoke 28 by which the land wheel axle $i$ is carried to the block 26, and then turning said yoke about the axis of the pivot 29 until the set of the land wheel I has been changed to the dotted line position, and finally resecuring the yoke to the block by said fastening bolts.

The line of travel of the implement will now be that indicated by the arrow $b$ since the line of draft and the position of the furrow wheel $f$ and land wheel I have been adjusted to bring this change about. It will be apparent that the furrow wheels G and H, as soon as the implement starts its movement, will automatically adjust themselves to the dotted position shown, which corresponds to the illustrated dotted positions of the wheels F and I.

I prefer to provide the rear furrow wheel G with means by which, in the plowing operation, it may be caused to caster either toward the right or toward the left, the means indicated for this purpose being of a well known construction comprising a lever 69 which is pivoted at 70 to the rear end of the bracket 23 and has a downwardly extending member 71 adapted to lie against the right hand side of the axle $g'$ of the rear furrow wheel G. When the parts are in this position, the wheel G is free to turn toward the left. If it is desired that it be free to turn toward the right, at the end of the furrow for example, it is only necessary to move the lever to thereby raise the member 71 from its engagement with the axle $g'$. A weight 72 at one end of the lever 69 will hold the member 71 in the raised position.

Having thus described the invention what I believe to be new and desire to secure by Letters Patent, is:—

1. A tillage implement comprising a plurality of frame units, each including front and rear longitudinal members relatively disposed to give it greater width at its inner than at its outer end, said units being positioned with their wider ends confronting each other, substantially horizontal pivots at the said wider ends of said units and about which the units have up or down pivotal movement relatively to each other, soil tilling means respectively carried by said units, and supporting means for the implement, including ground engaging supporting wheels respectively connected to the outer ends of the units.

2. A tillage implement according to claim 1 and in which each unit also includes a plurality of cross members which stiffen its front and rear members and in which also the soil tilling means are carried by said stiffening members.

3. A tillage implement comprising a plurality of frame units, each including front and rear longitudinal members relatively disposed to give it greater width at its inner than at its outer end, said units being positioned with their wider ends in a confronting relation, pivotal means at the said inner ends of the units arranged to permit relative up or down pivotal movements of their outer ends, gangs or sets of tilling disks carried by said units respectively, and ground engaging supporting wheels for said units responsive to unevenness in the land being worked and co-operating with said pivoted units to cause the tilling disks to work at a substantially uniform depth regardless of unevenness in the land.

4. A tillage implement comprising a plurality of open frame units, whose inner ends are pivoted to permit the units to have relative up or down pivotal movement about their said inner ends, each unit including front and rear longitudinal members relatively disposed to give it greater width at its inner than at its outer end and said units being arranged with their said inner ends in a confronting relationship, ground engaging supporting means connected to said units, soil tilling members respectively carried by said units and arranged between the front and rear members thereof, and means through which draft is applied to the units in a direction which is substantially at an acute angle with the units.

5. A tillage implement comprising a first plurality of frame units arranged in an end-to-end relation, and each including front and rear members relatively disposed to give it greater width at its inner than at its outer end, substantially horizontal pivoting means at the inner ends of said units to permit the outer end of either unit to move pivotally up or down relatively to the other unit, gangs or sets of soil tilting members respectively carried by said units and arranged between the front and rear members thereof, a second plurality of frame units respectively secured to the first frame units and movable pivotally therewith, ground engaging supporting wheels for said units responsive to unevenness in the land being worked and co-operating with said units to cause the soil tilling members to work at a substantially uniform depth regardless of unevenness in the land, one of said wheels being mounted in the space between the front and rear members of the first mentioned frame units at the inner ends of the latter, and means connected to one of the second frame units to apply draft to the implement in a direction which is substantially at an acute angle with the first units.

6. A tillage implement comprising a plurality of frame units arranged in an end-to-end relation, substantially horizontal pivotal means at the inner ends of said units to permit the outer end of either unit to move pivotally up or down relatively to the other unit, gangs or sets of soil tilling members respectively carried by said units, a draft frame unit comprising divergently arranged members whose outer ends are rigidly secured to each other and whose inner ends are rigidly secured to one of the first mentioned frame units and movable pivotally therewith at different places in the length of the latter, an additional frame unit secured to the other of the first mentioned units and pivotally connected to a member of the draft frame unit at a place in transverse alignment with the pivotal means at the inner ends of the first mentioned frame units, ground engaging supporting wheels connected to said first mentioned frame units, a ground engaging supporting wheel connected to said additional frame unit, and draft means connected to the draft frame unit and co-operating therewith to apply power to said first mentioned frame units in a direction which is at substantially an acute angle with the length of the latter.

7. A tillage implement comprising a first and a second gang supporting frame unit arranged in an end-to-end relation and each including front and rear members relatively disposed to give it greater width at its inner than at its outer end; substantially horizontal pivotal means at the inner ends of said units to permit the outer end of either unit to move pivotally up or down relatively to the other unit; gangs or sets of soil tilling members respectively carried by said units; a third frame unit secured to the first frame unit and movable pivotally therewith and including a frame member arranged diagonally to the length of the latter; a forward ground engaging supporting wheel to support the front end of the implement, said wheel having movement about a vertical axis to different angles with relation to the frame; a draft means comprising a plurality of members which are pivotally connected at their rear ends to the diagonal member of said third unit and extend thence convergently and cross each other at their front ends; the draft means also including means to secure said members adjustably to each other, a hitch member connected to the free end of one of said converging members and an extensible link connecting the hitch member with the forward supporting wheel; a fourth frame unit secured to the second frame unit and movable pivotally therewith; a ground engaging supporting wheel connected to the said fourth frame unit and having movement about a substantially vertical axis into different angular positions with relation thereto; means to secure said wheel in its different angular positions with relation to the fourth frame unit; a ground engaging supporting means, arranged at the outer end of the second frame unit and movable about a vertical axis with relation thereto; and an intermediate supporting wheel providing a common support for the frame adjacent the place at which its units are pivoted, and having movement about a vertical axis into different angular relations with the frame.

8. A tillage implement comprising a frame which includes a plurality of units arranged in an end-to-end relation, substantially horizontal pivotal means at the inner ends of said units to permit the outer end of either unit to move pivotally up or down relatively to the other unit, gangs or sets of soil tilling members respectively carried by said units and arranged in an end-to-end laterally offset relation, draft means having connection with said units and arranged to transmit power thereto in a direction which is substantially at an acute angle with the length of said units, said draft means including members which are settable to different selected positions with relation to each other to thereby change the line of draft for transport and tillage purposes, respectively, forward and rearward ground engaging supporting wheels for the implement each mounted to have movement about a vertical axis to permit its angular relationship to the frame to be changed in accordance with the adjustment of the draft means for said transport and tillage purposes, respectively, and a ground engaging supporting wheel mounted upon one end of a substantially crank-shaped axle whose other end is provided with a substantially vertical shaft having a journal connection with the frame, said wheel being arranged to move with its axle in the space provided by the offset relationship of the gangs or sets of soil tilling members into different angular positions with relation to the frame in accord with the adjustments of the draft means and serving as a support for the frame adjacent the inner ends of said units.

9. A soil tillage implement according to claim 8 and wherein each of said frame units comprises front and rear members relatively disposed to give it greater width at its inner than at its outer end, and the said gangs or sets of soil tilling members are respectively arranged adjacent to and parallel with the front member of one unit and the rear member of the other unit, to thereby position them in their said laterally offset relationship and to provide the space between their inner ends and within the boundaries of the frame for the movements of the last mentioned supporting wheel into its different angular relationships with the frame.

10. A tillage implement according to claim 8 and wherein the soil tilling members are rotative plowing disks and there are four ground engaging wheels, each movable into different angular relationships with respect to the frame about its vertical axis, and wherein also three of the supporting wheels are furrow wheels and the fourth wheel is a land wheel, and the several wheels are independently adjustable to thereby variably regulate the depth of penetration of the plowing disks.

11. A tillage implement comprising a frame provided with soil tillage members and having near one end a unit which extends from a side thereof, said unit having spaced outer ends provided with a reenforcing member arranged between and secured to said ends, a ground engaging supporting wheel, a crank axle one end of which supports said wheel, a member pivoted to said reenforcing member to have movement about a substantially vertical axis and which provides a bearing for the other end of said axle, means to secure the axle supporting member in its different positions to said reenforcing member, means through which draft is applied to said frame at different angles for transport and tillage purposes, respectively, and additional ground engaging supporting wheels having movement about vertical axes; said parts correlated to cause the implement to occupy a space having lesser width for transport purposes with relation to the space occupied by the implement when tilling the soil.

12. A soil tillage implement comprising a frame provided with soil tillage members and having near one end a unit which extends from a side thereof, said unit having spaced outer ends provided with a reenforcing member arranged between and secured to said ends, an axle-supporting member mounted to have pivotal movement about a substantially vertical axis, releasable means to secure said member fixedly in its different positions to the said reenforcing member, a crank axle one of whose arms is journaled in said member to have movement relatively thereto about a substantially horizontal axis, said axle partaking of the pivotal movement of the member, a ground engaging supporting wheel upon the outer end of said axle, means to turn the axle in its bearing in its supporting member and to fix it in selected positions to thereby correspondingly vary the height of the corresponding part of the frame, other supporting wheels mounted to be adjustable to vary the height of the frame and each movable relatively to the frame about a substantially vertical axis into different positions corresponding to different lines of draft for transport and tillage purposes respectively, and means through which draft is applied to said frame at different angles for tillage and transport purposes, respectively.

13. A one-way gang disk plow comprising a flexible frame including a plurality of end to end open frame units each having front and rear longitudinal members relatively arranged to give it greater width at its inner than at its outer end, the said inner ends of the units being arranged in juxtaposition and with their members in an overlapping relation, horizontal pivot pins extending through the overlapping ends of the members, a gang of plow disks carried by one frame unit, a second gang of plow disks carried by the other frame unit, said gangs being arranged between the front and rear members of the respective frame units and having their inner ends spaced from each other, supporting means including a wheel common to the two frame units and disk gangs and mounted to have movement about a vertical axis in the space at the junction of the inner ends of the frame units and between the disk gangs, and means through which draft is variably applicable to the plow.

14. A tillage implement comprising a flexible frame including a forward set and a rearward set of soil-working members and a forward frame unit and a rearward frame unit, respectively carrying said members; said units disposed in an end-to-end relation and diagonally to the line of draft and mounted at their inner ends to have relative up and down movement, and each including a forward member and a rearward member extending lengthwise of the unit and relatively arranged to provide a space to accommodate the corresponding set of soil-working members between them; and ground-engaging supporting means co-operating with said units to cause the soil-working members to work at a substantially uniform depth, regardless of any unevenness in the land being worked thereby.

15. A structure according to claim 14 and wherein each set of soil-working members is mounted on a shaft common thereto and which extends lengthwise of the corresponding unit between the forward and rearward members thereof.

16. A structure according to claim 14 and wherein the ground-engaging supporting means comprehends ground-engaging wheels respectively arranged to support the outer ends of the forward and rearward frame units and a ground-engaging wheel arranged in the space between the lengthwise extending members of said units and providing a common support for the inner ends of the units.

17. A structure according to claim 14 and wherein the ground-engaging supporting means comprehends independently adjustable ground-engaging wheels respectively arranged to support the outer ends of the forward and rearward frame units and a ground-engaging wheel arranged in the space between the lengthwise extending members of said units and providing a common support for the inner ends of the units, the last mentioned wheel being mounted to be adjustable independently of the other wheels.

18. A one-way gang disk plow comprising a plurality of open disk carrying units each including spaced members which extend lengthwise of the respective units, the inner ends of said members of each unit overlapping the corresponding members of the next unit and being pivoted thereto to permit the units to have movement automatically up or down relatively to each other in accord with any unevenness in the land being worked; sets of simultaneously acting plow disks arranged between the lengthwise extending members of the respective disk carrying units and carried thereby; and ground-engaging supporting wheels for said units.

19. A structure according to claim 18 and in which the ground-engaging supporting wheels include a furrow wheel supporting the outer end of one unit, a second furrow wheel supporting the outer end of the other unit, a third furrow wheel common to the inner ends of said units, and a land wheel on the side of the implement opposite said furrow wheels.

20. A one-way gang disk plow according to claim 18 and wherein the ground-engaging supporting wheels include furrow wheels respectively supporting the outer ends of the disk carrying units, a furrow wheel common to the inner ends of said units, said wheels adjustable independently of each other, and a land wheel on the side of the implement opposite said furrow wheels and adjustable independently of the latter and acting as a gauge wheel in the plowing operation.

21. A tillage implement comprising a forward gang frame and a rearward gang frame arranged in an end-to-end relation, pivotal means connecting the inner ends of said frames with each other to permit the outer end of either to move pivotally up or down relatively to the other, gangs or sets of soil tilling members respectively carried by said frames, a draft frame projecting from the side of the forward gang frame and including a side member and a forward member both of which are secured to the forward gang frame, said members extending in different directions oblique to the gang frame into an intersecting relationship with each other and being secured to each other at the forward end of the side member, a wheel supporting frame projecting from the side of the rearward gang frame and secured thereto and having a forwardly projecting member, means arranged substantially in line with the pivotal connection between the gang frames and pivotally connecting the side member of the draft frame with the forward member of the wheel supporting frame, ground engaging implement supporting means respectively connected to the forward gang frame and to the wheel supporting frame, and draft means including members whose rear ends are pivoted to the forward member of the draft frame, said members being relatively adjustable to apply draft to the implement along selected lines which are substantially at acute angles with relation to the gang frames.

CHARLES T. RAY.